United States Patent
Kobayashi et al.

(10) Patent No.: US 10,646,802 B2
(45) Date of Patent: May 12, 2020

(54) SUCTION FILTER AND FUEL SUPPLY DEVICE

(71) Applicant: DENSO CORPORATION, Kariya, Aichi-pref. (JP)

(72) Inventors: Kiyomori Kobayashi, Kariya (JP); Norihiro Hayashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 21 days.

(21) Appl. No.: 16/069,531

(22) PCT Filed: Jan. 27, 2017

(86) PCT No.: PCT/JP2017/002842
§ 371 (c)(1),
(2) Date: Jul. 12, 2018

(87) PCT Pub. No.: WO2017/150024
PCT Pub. Date: Sep. 8, 2017

(65) Prior Publication Data
US 2019/0022563 A1 Jan. 24, 2019

(30) Foreign Application Priority Data
Mar. 1, 2016 (JP) ................. 2016-039280

(51) Int. Cl.
*B01D 35/00* (2006.01)
*B01D 36/00* (2006.01)
*B01D 35/027* (2006.01)
*F02M 37/22* (2019.01)
*F02M 37/50* (2019.01)
*B01D 29/15* (2006.01)
*F02M 37/10* (2006.01)

(52) U.S. Cl.
CPC .......... *B01D 35/005* (2013.01); *B01D 29/15* (2013.01); *B01D 35/027* (2013.01); *B01D 35/0273* (2013.01); *B01D 36/001* (2013.01); *F02M 37/106* (2013.01); *F02M 37/22* (2013.01); *F02M 37/50* (2019.01)

(58) Field of Classification Search
None
See application file for complete search history.

(56) References Cited

U.S. PATENT DOCUMENTS

2005/0006300 A1   1/2005   Sato et al.

FOREIGN PATENT DOCUMENTS

| JP | 3924152 | 6/2007 |
| JP | 2012-112333 | 6/2012 |

(Continued)

*Primary Examiner* — Chester T Barry
(74) *Attorney, Agent, or Firm* — Nixon & Vanderhye P.C.

(57) ABSTRACT

A suction filter, through which fuel is suctioned into a suction port of a fuel pump after filtering the fuel in an inside of a fuel tank of a vehicle, includes a filter screen and a plurality of fuel stoppers. The filter screen is placed to cover an inside space, in which a negative suction pressure is exerted from the suction port. The filter screen includes a bottom wall that forms the inside space and is formed as a permeable wall, through which the fuel and air are permeable, and the filter screen filters the fuel permeated through the permeable wall. The fuel stoppers are arranged along the bottom wall from a side, at which the suction port is located, toward an away side, which is away from the suction port. The fuel stoppers extend toward the bottom wall in the inside space.

13 Claims, 16 Drawing Sheets

(56) References Cited

FOREIGN PATENT DOCUMENTS

| | | |
|---|---|---|
| JP | 2013-249783 | 12/2013 |
| JP | 5575602 | 8/2014 |
| JP | 5608522 | 10/2014 |
| JP | 2015-155700 | 8/2015 |
| WO | 2014/156862 | 10/2014 |

SUCTION PORT SIDE ←→ AWAY SIDE

SUCTION PORT SIDE ←→ AWAY SIDE

SUCTION PORT SIDE ←→ AWAY SIDE

SUCTION PORT SIDE ←→ AWAY SIDE

SUCTION PORT SIDE ←——→ AWAY SIDE

SUCTION PORT SIDE ←——→ AWAY SIDE

SUCTION PORT SIDE ←——→ AWAY SIDE

SUCTION PORT SIDE ←→ AWAY SIDE

SUCTION PORT SIDE ←→ AWAY SIDE

SUCTION FILTER AND FUEL SUPPLY DEVICE

CROSS REFERENCE TO RELATED APPLICATION

This application is the U.S. national phase of International Application No. PCT/JP2017/002842 filed Jan. 27, 2017, which designated the U.S. and claims priority to Japanese Patent Application No. 2016-39280 filed on Mar. 1, 2016, the entire contents of each of which are hereby incorporated by reference.

TECHNICAL FIELD

The present disclosure relates to a suction filter and a fuel supply device.

BACKGROUND ART

Previously, in a fuel supply device that is configured to supply fuel from an inside of a fuel tank of a vehicle to an internal combustion engine located at an outside of the fuel tank, the fuel, which is drawn from the fuel tank through a fuel pump, is discharged to the outside of the fuel tank.

A device of the patent literature 1, which serves as the fuel supply device described above, includes a suction filter, through which fuel is suctioned into a suction port of the fuel pump after filtering the fuel in the inside of the fuel tank. In the suction filter disclosed in the patent literature 1, a filter material, which serves as a filter screen and filters the fuel that permeates through the filter material, is placed to cover an inside space, into which a negative suction pressure is exerted from the suction port.

In the suction filter of the patent literature 1, when the fuel is forced and is displaced to one side in the fuel tank by an inertial force at a time of turning the vehicle or at a time of accelerating or decelerating the vehicle, the filter material is exposed from a surface of the fuel in the tank. Thereby, in the exposed state of the filter material, the fuel is suctioned from the inside space of the suction filter into the suction port and is thereby reduced in the inside space of the suction filter. In such a case, the air, the amount of which corresponds to the reduced amount of the fuel in the inside space of the suction filter, permeates through the filter material and is suctioned into the inside space of the suction filter. At this time, the inertial force of the fuel and the inertial force of the air are different from each other, and the air is more likely to move toward the suction port than the fuel. For this reason, the air is suctioned into the suction port in preference to the fuel. The preferential suctioning of the air deteriorates a suction efficiency of the fuel pump for suctioning the fuel into the suction port. Here, the deterioration of the suction efficiency of the fuel at the fuel supply device that supplies the discharged fuel, which is discharged from the fuel pump, to the internal combustion engine of the vehicle, may possibly cause drivability deterioration or engine stall and is thereby not desirable.

CITATION LIST

Patent Literature

PATENT LITERATURE 1: JP2005-30351A (corresponding to US2005/0006300A1)

SUMMARY OF INVENTION

The present disclosure is made in view of the above disadvantages, and it is an objective of the present disclosure to provide a suction filter and a fuel supply device that ensure a required suction efficiency of fuel suctioned into a suction port by a fuel pump.

In order to achieve the above objective, according to a first aspect of the present disclosure, there is provided a suction filter, through which fuel is suctioned into a suction port of a fuel pump after filtering the fuel in an inside of a fuel tank of a vehicle, the suction filter including:

a filter screen that is placed to cover an inside space, in which a negative suction pressure is exerted from the suction port, wherein the filter screen includes a bottom wall that forms the inside space and is formed as a permeable wall, through which the fuel and air are permeable, and the filter screen filters the fuel permeated through the permeable wall; and a plurality of fuel stoppers that are arranged along the bottom wall from a side, at which the suction port is located, toward an away side, which is away from the suction port, wherein the plurality of fuel stoppers extends toward the bottom wall in the inside space.

Furthermore, in order to achieve the above objective, according to a second aspect of the present disclosure, there is provided a fuel supply device configured to supply fuel from an inside of a fuel tank of a vehicle toward an internal combustion engine located at an outside of the fuel tank, the fuel supply device including:

a fuel pump that discharges the fuel, which is suctioned into a suction port of the fuel pump in the inside of the fuel tank, toward the outside of the fuel tank; and a suction filter, through which the fuel is suctioned into the suction port after filtering the fuel in the inside of the fuel tank, wherein the suction filter includes:

a filter screen that is placed to cover an inside space, in which a negative suction pressure is exerted from the suction port, wherein the filter screen includes a bottom wall that forms the inside space and is formed as a permeable wall, through which the fuel and air are permeable, and the filter screen filters the fuel permeated through the permeable wall; and a plurality of fuel stoppers that are arranged along the bottom wall from a side, at which the suction port is located, toward an away side, which is away from the suction port, wherein the plurality of fuel stoppers extends toward the bottom wall in the inside space.

According to the first aspect and the second aspect, at the filter screen that covers the inside space, in which the negative suction pressure is exerted through the suction port of the fuel pump, the bottom wall, which forms the inside space, filters the fuel that permeates through the bottom wall. Therefore, at the inside space, which is formed by the bottom wall, the fuel, which flows from the suction port along the bottom wall toward the away side that is away from the suction port, is stopped by the fuel stoppers, which project toward the bottom wall side. Therefore, when the filter screen is exposed from the surface of the fuel upon forcing of the fuel to the one side in the fuel tank by the action of the inertial force, the air, which permeates from the outside of the surface of the fuel into the inside space through the bottom wall, is mixed as air bubbles in the fuel that is stopped by the fuel stoppers. As a result, the fuel, which is in the air mixed state, receives the negative suction pressure exerted from the suction port and may be thus moved toward the suction port against the inertial force at the location where the inertial force is applied to the fuel toward the away side that is away from the suction port.

At this time, when the movement of the fuel progresses further, the fuel begins to move toward the away side due to a difference in the inertial force exerted to the fuel. However, due to the structure, in which the fuel stoppers are spread toward the away side, even when the fuel returns toward the away side after the movement of the fuel from the previous stop location, at which the fuel is stopped by one of the fuel stoppers, toward the suction port, the fuel can be stopped once again by another one of the fuel stoppers, which is located on the suction port side of the previous stop location. Accordingly, the air is mixed in the fuel at this subsequent stop location, so that the movement of the fuel is repeated. Thereby, even in the air-suctioning state where the air is suctioned into the inside space, the fuel in the inside space can be suctioned into the suction port by using the air to promote the movement of the fuel. Therefore, in the first aspect and the second aspect discussed above, a required suction efficiency of the fuel pump for suctioning the fuel into the suction port can be ensured. In addition, according to the second aspect, in which the fuel discharged from the fuel pump is supplied to the internal combustion engine of the vehicle, it is possible to limit the drivability deterioration and the engine stall.

BRIEF DESCRIPTION OF DRAWINGS

The present disclosure, together with additional objectives, features and advantages thereof, will be best understood from the following description, the appended claims and the accompanying drawings.

DESCRIPTION OF EMBODIMENTS

Hereinafter, embodiments of the present disclosure will be described with reference to the drawings. In the following respective embodiments, similar structural elements are indicated by the same reference signs and may not be redundantly described. In a case where only a part of a structure is described in each of the following embodiments, the rest of the structure of the embodiment may be the same as that of previously described one or more of the embodiments. Besides the explicitly described combination(s) of structural components in each of the following embodiments, the structural components of different embodiments may be partially combined even though such a combination(s) is not explicitly described as long as there is no problem.

First Embodiment

Figure 1:
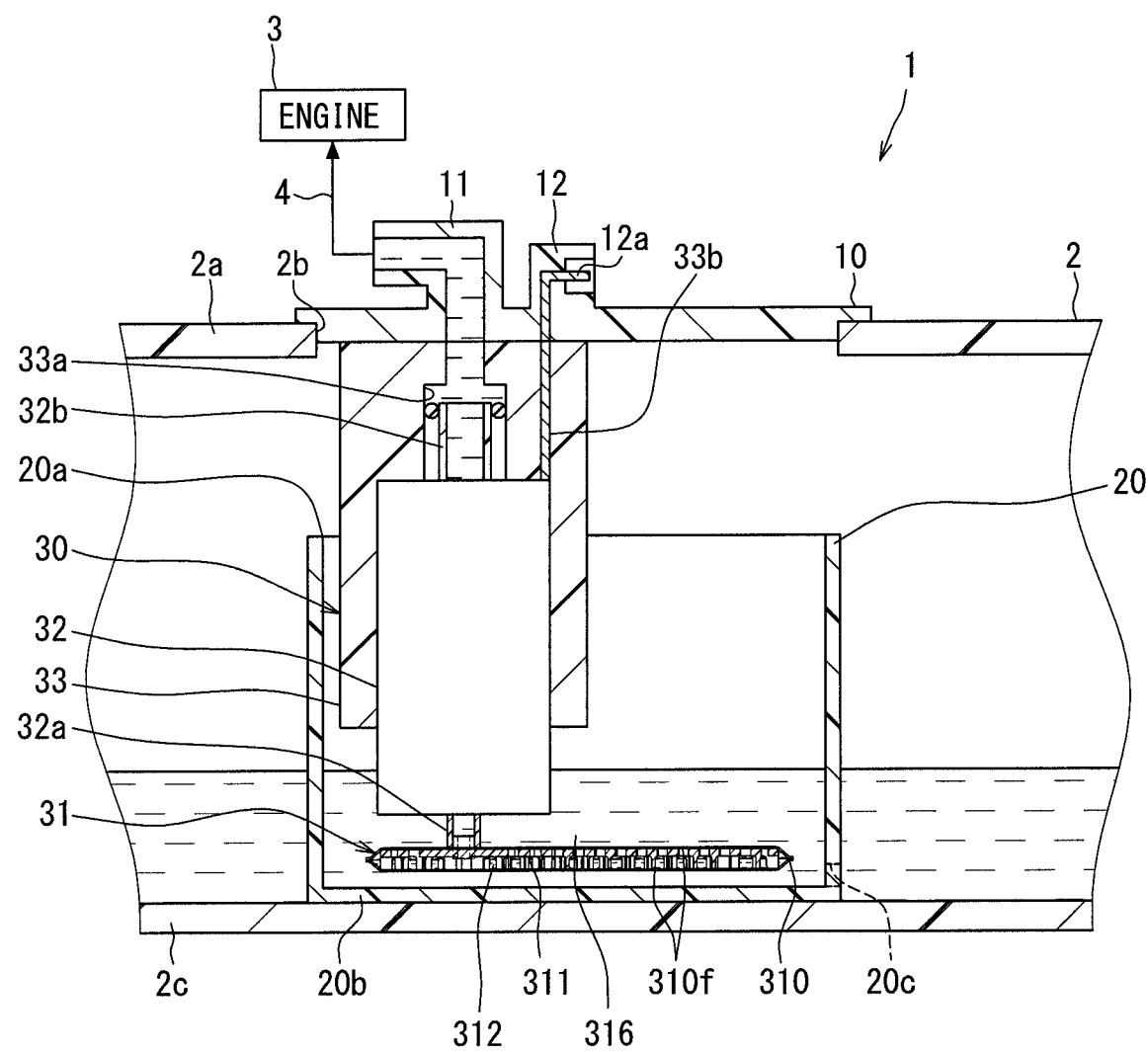
FIG. 1 is a cross-sectional view showing a fuel supply device according to a first embodiment.

As shown in FIG. 1, a fuel supply device 1 according to a first embodiment of the present disclosure is installed to a fuel tank 2 of a vehicle. The device 1 supplies fuel, which is accumulated in an inside of the fuel tank 2, to an internal combustion engine 3 located at an outside of the fuel tank 2. Here, the fuel tank 2, to which the device 1 is installed, is made of resin and is shaped into a hollow form to store the fuel to be supplied to the internal combustion engine 3. Furthermore, the internal combustion engine 3, to which the fuel is supplied from the device 1, may be a gasoline engine or a diesel engine. A horizontal direction and a vertical direction of the vehicle placed on a horizontal plane substantially coincide with a transverse direction and a top-to-bottom direction, respectively, in FIG. 1.

Overall Structure

First of all, an overall structure of the device 1 will be described.

The device 1 includes a flange 10, a sub-tank 20 and a pump unit 30.

The flange 10 is made of resin and is shaped into a circular plate form. The flange 10 is installed to a ceiling plate portion 2a that covers an inside of the fuel tank 2 from an upper side of the fuel tank 2. The flange 10 closes a through-hole 2b that extends through the ceiling plate portion 2a.

The flange 10 integrally includes a fuel supply pipe 11 and an electric connector 12. At the inside of the fuel tank 2, the fuel supply pipe 11 is communicated with the pump unit 30. At the outside of the fuel tank 2, the fuel supply pipe 11 is communicated with a fuel path 4 that is in turn communicated with the internal combustion engine 3. A fuel pump 32 of the pump unit 30 supplies the fuel, which is accumulated in the inside of the fuel tank 2, to the internal combustion engine 3 located at the outside of the fuel tank 2 through the fuel supply pipe 11. Metal terminals 12a are embedded in the electric connector 12. The metal terminals 12a are electrically connected to the fuel pump 32 at the inside of the fuel tank 2. The metal terminals 12a are electrically connected to an external control circuit at the outside of the fuel tank 2. With the above-described electrically connecting configuration, the external control circuit can control the operation of the fuel pump 32.

The sub-tank 20 is made of resin and is shaped into a bottomed cylindrical tubular form. The sub-tank 20 is received in the inside of the fuel tank 2 such that an opening 20a of the sub-tank 20 faces the upper side. A bottom portion 20b of the sub-tank 20 is placed on a bottom portion 2c of the fuel tank 2. The sub-tank 20 has a flow inlet 20c at a location that is adjacent to the bottom portion 20b. The fuel can flow from the inside of the fuel tank 2 into an inside of the sub-tank 20 through the flow inlet 20c.

The pump unit 30 is received in the inside of the fuel tank 2 such that the pump unit 30 extends from the inside to the outside of the sub-tank 20. The pump unit 30 includes a suction filter 31, the fuel pump 32 and a communication member 33.

The suction filter 31 is shaped into a planar form as a whole. The suction filter 31 is placed on the bottom portion 20b in the inside of the sub-tank 20. The suction filter 31 filters the fuel, which flows into the sub-tank 20 in the fuel tank 2, so that the suction filter 31 captures the foreign objects contained in this fuel. The fuel, which is filtered through the suction filter 31, is suctioned into a suction port 32a of the fuel pump 32.

The fuel pump 32 is an electric pump that is shaped into a cylindrical tubular form as a whole. The fuel pump 32 extends from an upper side of the suction filter 31 in the sub-tank 20 to the outside of the sub-tank 20. The suction port 32a of the fuel pump 32 is communicated with the suction filter 31. The fuel pump 32 is operated through a control operation from the external control circuit. The fuel pump 32, which is under the operation, suctions the filtered fuel, which is filtered through the suction filter 31, from the suction port 32a. The fuel, which is suctioned into the suction port 32a, undergoes the pressurization in the fuel pump 32, so that the fuel is discharged from a discharge outlet 32b of the fuel pump 32 toward the internal combustion engine 3 at the outside of the fuel tank 2.

The communication member 33 is made of resin and is shaped into a hollow form. The communication member 33 is placed to extend from a periphery of the fuel pump 32 in the sub-tank 20 to the outside of the sub-tank 20. The communication member 33 is fixed to the flange 10 at the outside of the sub-tank 20. The communication member 33 forms a communication passage 33a that is communicated with the discharge outlet 32b and the fuel supply pipe 11. The communication passage 33a supplies the fuel, which is discharged from the fuel pump 32 through the discharge outlet 32b, toward the internal combustion engine 3 through the fuel supply pipe 11. Metal lead wires 33b are embedded in the communication member 33 to electrically connect the fuel pump 32 to the metal terminals 12a.

Structural Details of Suction Filter

Figure 2:
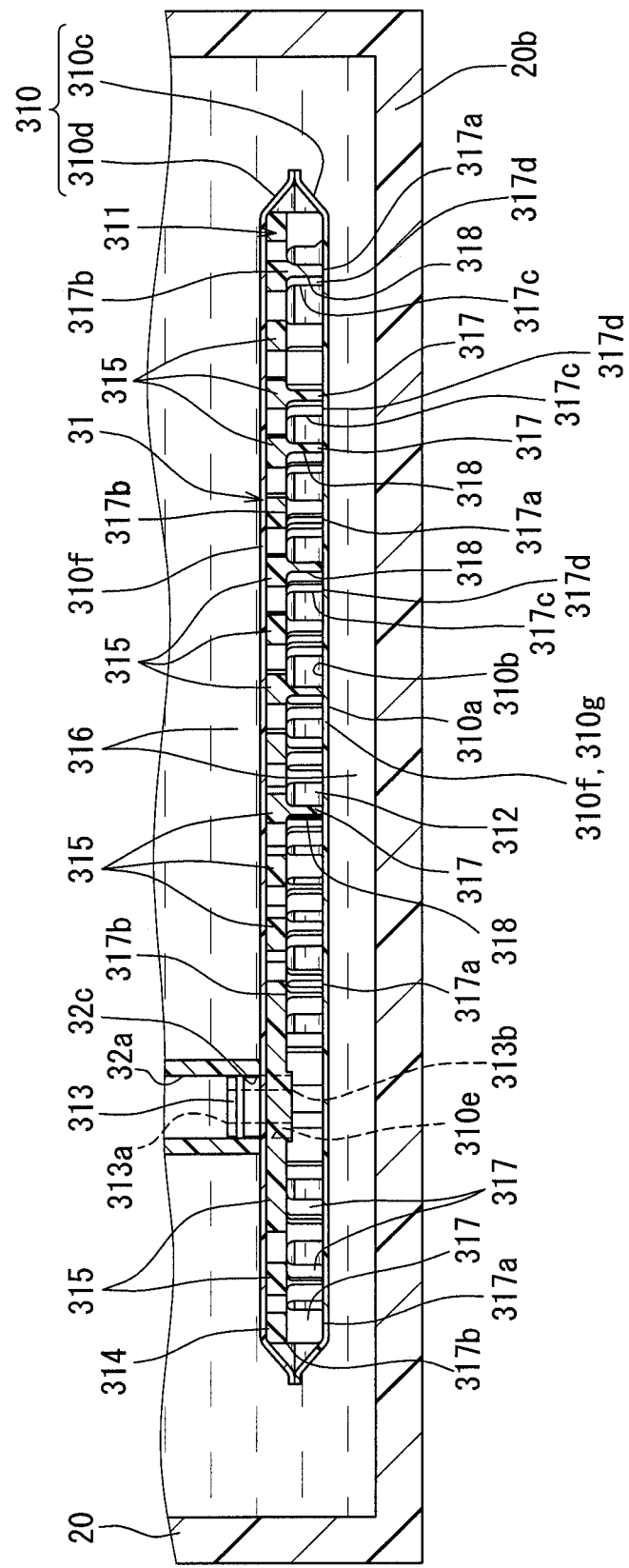
FIG. 2 is an enlarged cross-sectional view showing a suction filter according to the first embodiment.

Next, structural details of the suction filter 31 will be described. As shown in FIGS. 1 and 2, the suction filter 31 includes a filter screen 310 and a support element 311.

The filter screen 310 is shaped into a hollow bag form such that an outside surface 310a of the filter screen 310 is exposed in the inside of the sub-tank 20 shown in FIG. 2 in the fuel tank 2, and an inside surface 310b of the filter screen 310 entirely covers an inside space 312 of the filter screen 310. The filter screen 310 is constructed such that outer peripheral edge parts of a pair of filter sheets 310c, 310d are liquid-tightly joined together.

Each filter sheet 310c, 310d is made of a material, such as porous resin, a woven fabric, an unwoven fabric, a resin mesh or a metal mesh, which implements the filtering function, and each filter sheet 310c, 310d is configured in a form of a soft or rigid curved film. In the present embodiment, each filter sheet 310c, 310d is entirely made of the above-described material. Therefore, a permeable wall 310f, through which the fuel is permeable, is formed by a majority of the filter screen 310 that is other than the joint portion of the filter screen 310, at which the sheets 310c, 310d are joined together. A pore size of each filter sheet 310c, 310d is set such that the filter sheet 310c, 310d can capture fine foreign objects, each of which has an outer diameter that is equal to or larger than, for example, 10 μm, as foreign objects contained in the fuel conducted from the inside of the fuel tank 2 into the inside of the sub-tank 20.

In the filter screen 310, the upper filter sheet 310d, which is joined to the upper side of the lower filter sheet 310c, has a through-hole 310e. The suction port 32a of the fuel pump 32 extends from the outside space 316 of the filter screen 310 to the inside space 312 of the filter screen 310 through the through-hole 310e. The through-hole 310e is liquid-tightly joined to a periphery of the opening 32c, which faces the lower side at the suction port 32a. With this joining configuration of the filter screen 310, in the present embodiment, a bottom wall 310g, which is a part of the permeable wall 310f of the filter screen 310 and is exposed to the inside space 312 from the lower side of the inside space 312, is spaced from the bottom portion 20b of the sub-tank 20 toward the upper side.

The filter screen 310, which is constructed in the above-described manner, captures the foreign objects at permeating parts of the permeable wall 310f to implement the filtering function at the time of permeating the fuel, which is conducted from the inside of the fuel tank 2 to the inside of the sub-tank 20 shown in FIG. 1, to the inside space 312 through the permeating parts of the permeable wall 310f. Here, the permeating parts may be gaps in fine holes in the case where the material of the filter screen 310 is the porous resin. Alternatively, the permeating parts may be gaps among the fibers in the case where the material of the filter screen 310 is the woven fabric or the unwoven fabric. Further alternatively, the permeating parts may be gaps among the meshes in the case where the material of the filter screen 310 is the resin mesh or the metal mesh.

At the permeating parts, the fuel is captured in the gaps by the surface tension. Specifically, simultaneously with the implementation of the filtering function of the filter screen 310, a liquid film is formed such that the liquid film covers the outside surface 310a of the filter screen 310 shown in FIG. 2. Specifically, the filter screen 310 forms the liquid film at the outside surface 310a, and at the same time the filter screen 310 implements the filtering function for filtering the fuel. Also, in order to capture the foreign objects having the above-described outer diameter through the filtering function, the pore size of the filter screen 310 is set to, for example, about 10 μm as a minimum size of the gaps located at the permeating parts that permeate the fuel. Furthermore, with the above-described setting, the air located at the outside of the fuel surface in the outside space 316 can permeate through the permeable wall 310f of the filter screen 310. Here, particularly, the air, which is located at the outside of the surface of the fuel, can permeate through the bottom wall 310g of the permeable wall 310f of the filter screen 310 from the outside space 316 located between the bottom portion 20b of the sub-tank 20 and the bottom wall 310g.

Figure 3:
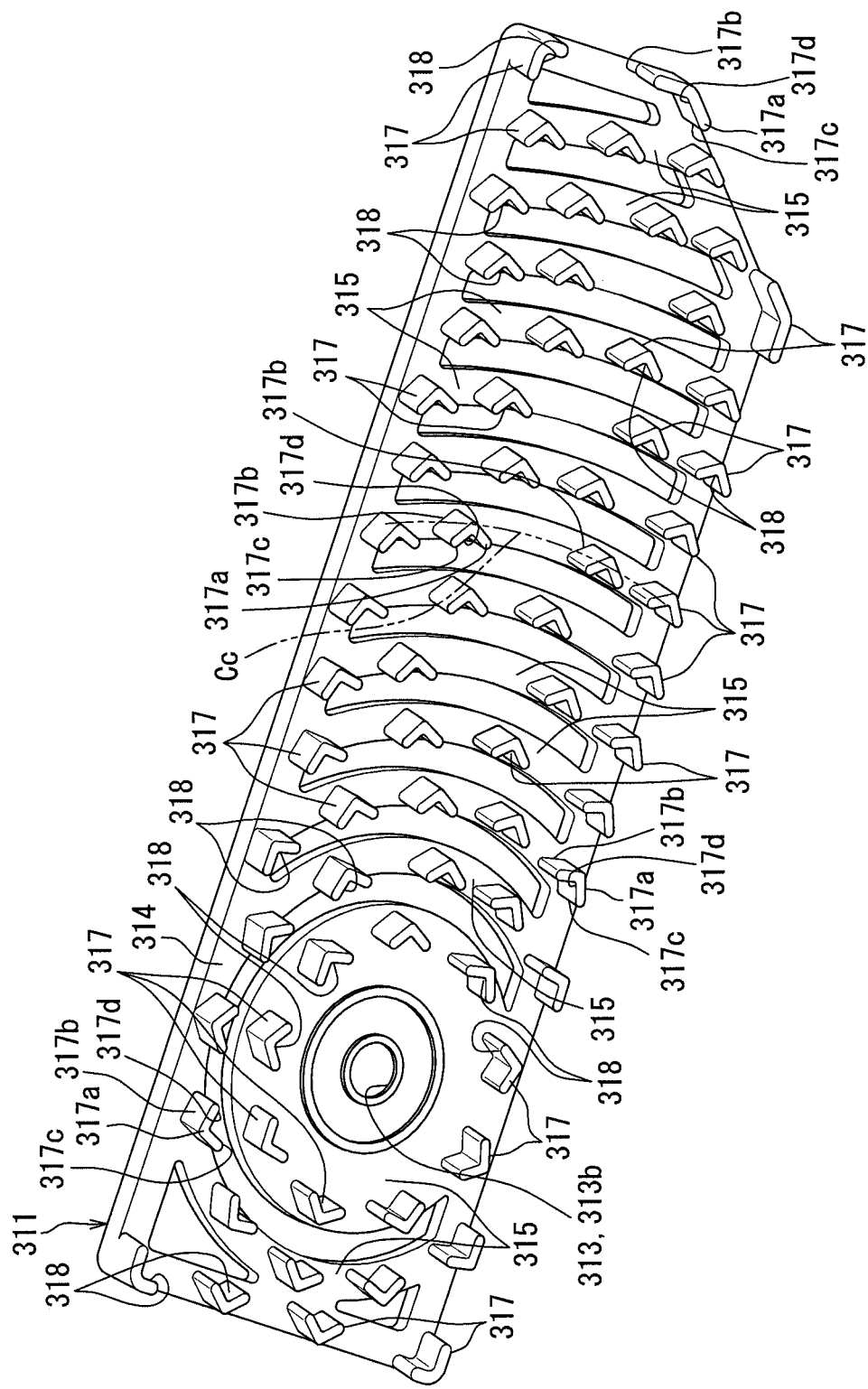
FIG. 3 is a bottom surface side perspective view showing a support element according to the first embodiment.
Figure 4:
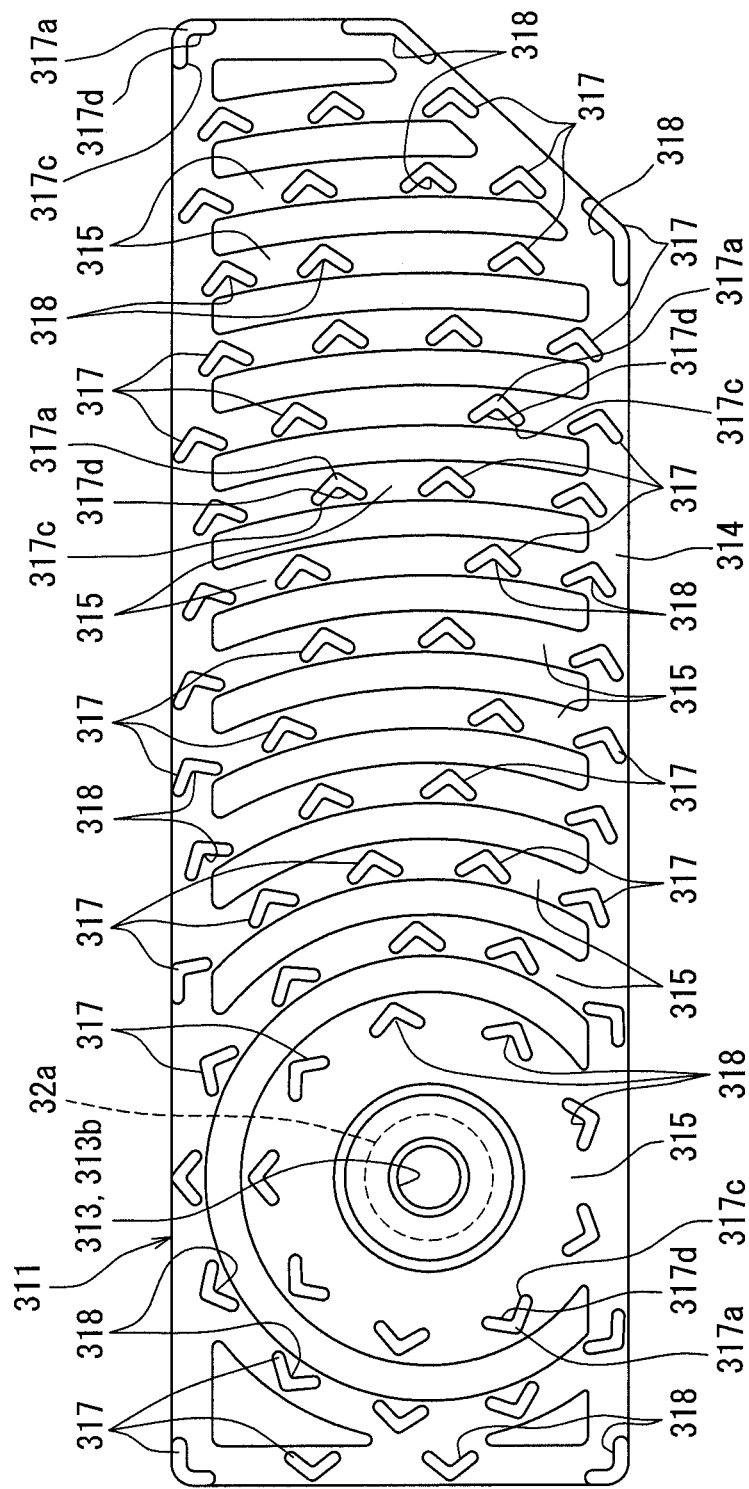
FIG. 4 is a bottom surface view showing the support element according to the first embodiment.

The support element 311 is received in the inside space 312 as a hard internal skeletal element that is made of resin and maintains the shape of the filter screen 310. As shown in FIGS. 2 to 4, a communication opening 313, a support frame 314, a plurality of beams 315 and a plurality of fuel stoppers 317 are integrally formed in one piece at the support element 311.

The communication opening 313 is shaped into a cylindrical form and opens toward both of the upper side and the lower side in the top-to-bottom direction. An opening 313a of the communication opening 313, which opens toward the upper side, is liquid-tightly fitted to and is communicated with the suction port 32a. An opening 313b of the communication opening 313, which opens toward the lower side, is exposed to and is communicated with the inside space 312. With this communicating configuration, a negative suction pressure, which is generated at the time of operating the fuel pump 32, can be exerted from the suction port 32a to the inside space 312 through the communication opening 313. Furthermore, sides, which are away from corresponding circumferential points, respectively, of the suction port 32a along the bottom wall 310g, are respectively defined as "away sides" while the suction port 32a is coaxially communicated with the communication opening 313. In the following discussion, these away sides are collectively referred to as an away side.

Figure 5:
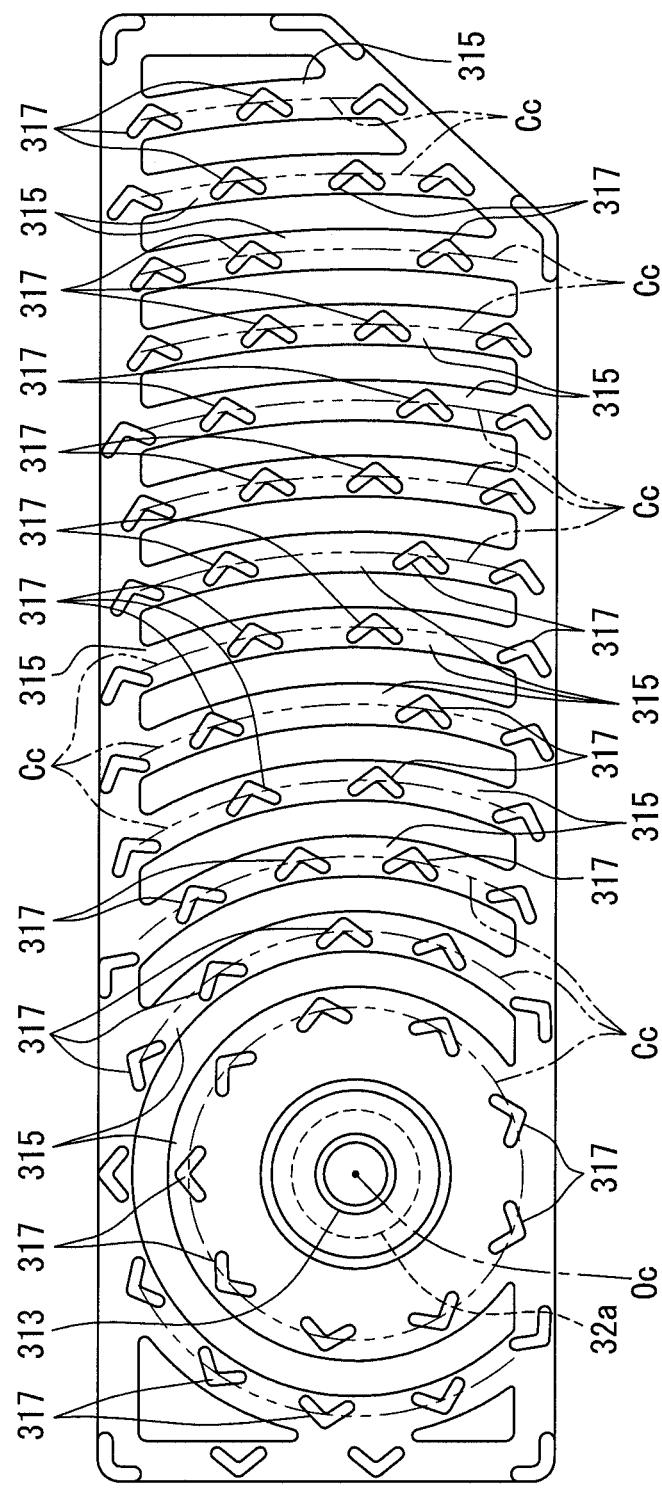
FIG. 5 is a bottom surface schematic view for describing the support element according to the first embodiment.

The support frame 314 is formed into a trapezoidal frame form that continuously extends on a radially outer side of the communication opening 313. The support frame 314 supports the upper filter sheet 310d of the filter screen 310 from a lower side of the upper filter sheet 310d. The beams 315 are placed on the radially outer side of the communication opening 313 and on the radially inner side of the support frame 314. As shown in FIG. 5, each of the beams 315 is in a form of a arcuate plate that extends along a corresponding one of imaginary concentric circles Cc that are concentric about the suction port 32a and the communication opening 313. The beams 315 are spaced away from each other in the transverse direction that is along the bottom wall 310g. A reference sign Oc shown in FIG. 5 indicates a common center point that is common to the concentric circles Cc and is common to the suction port 32a and the communication opening 313 in the present embodiment. Furthermore, in the present embodiment, although the concentric circles Cc are all assumed to be perfect circles, the concentric circles Cc may be assumed to be ellipses.

As shown in FIGS. 2 to 4, the fuel stoppers 317 extend from a plurality of locations, which are at the support frame 314 and the beams 315, toward the side where the bottom wall 310g of the filter screen 310 is placed. Specifically, the fuel stoppers 317 are placed at: the support frame 314 placed at a periphery portion (away-side periphery portion) of the inside space 312 located at the away side that is away from the suction port 32a in the inside space 312; and the beams 315 respectively placed at the plurality of portions of the inside space 312 on the suction port 32a side of the away-side periphery portion in the inside space 312. With the above-described configuration, the fuel stoppers 317 are spread from the suction port 32a side toward the away side, which is away from the suction port 32a. Furthermore, as shown in FIG. 5, each of the beams 315 is provided with corresponding ones of the fuel stoppers 317 such that the corresponding ones of the fuel stoppers 317 at least partially project from the beam 315. Furthermore, the corresponding ones of the fuel stoppers 317 are arranged one after another in the circumferential direction along each of the concentric circles Cc. Also, at each adjacent two of the concentric circles Cc, the corresponding ones of the fuel stoppers 317 at one of the adjacent two of the concentric circles Cc are displaced in the circumferential direction from the other corresponding ones of the fuel stoppers 317 at the other one of the adjacent two of the concentric circles Cc.

Here, the above-described configuration, in which the corresponding ones of the fuel stoppers 317 at the one of the adjacent two of the concentric circles Cc are displaced in the circumferential direction from the other corresponding ones of the fuel stoppers 317 at the other one of the adjacent two of the concentric circles Cc, may be implemented such that the corresponding ones of the fuel stoppers 317 at the one of the adjacent two of the concentric circles Cc are partially overlapped in the radial direction of the concentric circles Cc with the other corresponding ones of the fuel stoppers 317 at the other one of the adjacent two of the concentric circles Cc, or alternatively the corresponding ones of the fuel stoppers 317 at the one of the adjacent two of the concentric circles Cc are not overlapped in the radial direction of the concentric circles Cc with the other corresponding ones of the fuel stoppers 317 at the other one of the adjacent two of the concentric circles Cc. Furthermore, each radially adjacent two of the fuel stoppers 317, which are respectively placed at the corresponding adjacent two of the concentric circles Cc and are closest to each other in the radial direction of the concentric circles Cc, are configured such that a radial distance between the radially adjacent two of the fuel stoppers 317 is set to enable a reciprocating movement of the fuel between the radially adjacent fuel stoppers 317 in a manner discussed later.

As shown in FIGS. 2 to 4, each fuel stopper 317 is shaped in a form of a bent plate that projects toward the lower side of at least one of the support frame 314 and the beams 315. A lower end part 317a of each fuel stopper 317 supports the lower filter sheet 310c of the filter screen 310 from the upper side of the lower filter sheet 310c. The upper end parts 317b of corresponding ones of the fuel stoppers 317 are interconnected with each other in the circumferential direction of the corresponding concentric circle Cc by the corresponding beam 315 or are interconnected with each other in the circumferential direction of the support frame 314 by the support frame 314.

In a plan view taken from the lower side, each fuel stopper 317 is in a form of a V-shape that is bent at one point. Specifically, each fuel stopper 317 is recessed as a V-shape recess toward the away side that is away from the suction port 32a. Each fuel stopper 317 includes a fuel holding portion 318 that is formed in the inside of the V-shape recess and opens toward both of the bottom wall 310g side (serving as the lower side) and the suction port 32a side in the transverse direction. An opening (hereinafter referred to as a bottom-wall-side opening) 317d of the fuel holding portion 318 of each fuel stopper 317, which opens toward the bottom wall 310g, is covered with the bottom wall 310g that supports the lower end part 317a. An opening (hereinafter referred to as a suction-port-side opening) 317c of the fuel holding portion 318 of each fuel stopper 317, which opens toward the suction port 32a, is exposed to the inside space 312.

Figure 6:
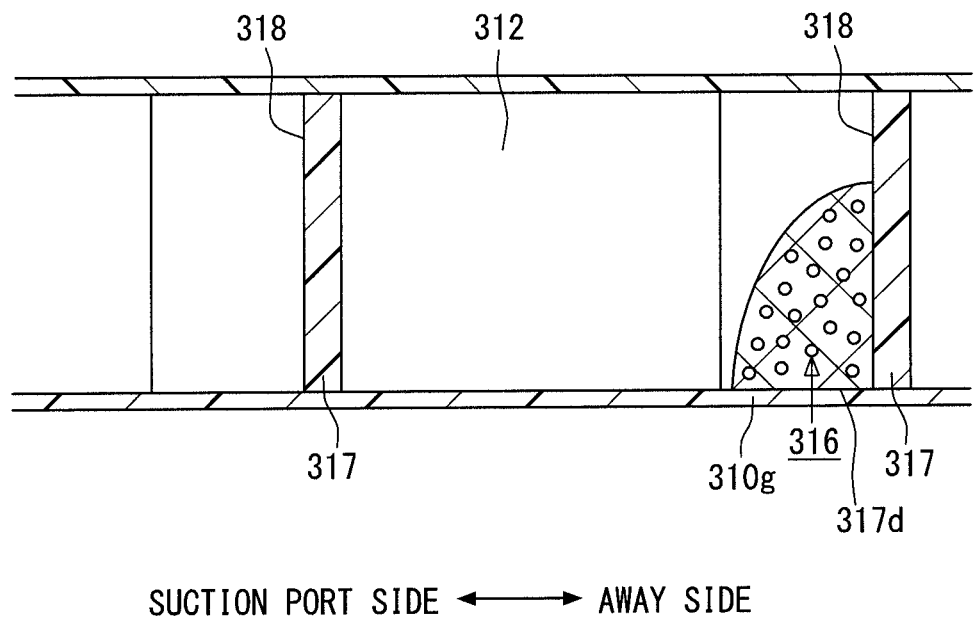
FIG. 6 is a cross-sectional schematic view for describing effects and advantages according to the first embodiment.

With the above-described configuration, the fuel holding portion 318 of each fuel stopper 317 stops the fuel, which flows toward the away side that is away from the suction port 32a in the inside space 312. Thereby, as shown in FIG. 6, the fuel holding portion 318 of each fuel stopper 317 can implement the holding function for holding the fuel from the away side that is away from the suction port 32a. Furthermore, as shown in FIG. 6, at each fuel stopper 317, the air, which enters the bottom-wall-side opening 317d after passing through the bottom wall 310g from the outside of the fuel surface S (see, for example, FIG. 10) at the outside space 316, can be mixed as air bubbles in the fuel, which is held at the fuel holding portion 318 of each corresponding fuel stopper 317.

An apparent specific gravity of the fuel, which is in the air mixed state at the fuel holding portion 318 of each corresponding fuel stopper 317, is reduced in comparison to an apparent specific gravity of the fuel before the mixing of the air in the fuel. Here, the apparent specific gravity refers to a specific gravity of the fuel in an ideal mixed state where the air is uniformly mixed in the fuel. In FIG. 6 as well as FIGS. 7 to 9, which will be described later, in order to ease the understanding of the description, the fuel, which is actually spread and is held at the fuel holding portion 318, is schematically indicated by a crosshatching, and the air, which is mixed in the fuel as air bubbles, is schematically indicated by blank circles. Furthermore, examples of a situation where the fuel in the sub-tank 20 is forced and is displaced to one side in the sub-tank 20 to result in the exposure of the filter screen 310 from the fuel surface S shown in FIG. 10, may include a situation where a centrifugal force is applied as an inertial force F to the vehicle traveling on, for example, a curved road, and a situation where an inertial force F, which is generated by acceleration, is applied to the vehicle that is accelerating or decelerating.

Effects and Advantages

Effects and advantages of the first embodiment will be described below.

Figure 7:
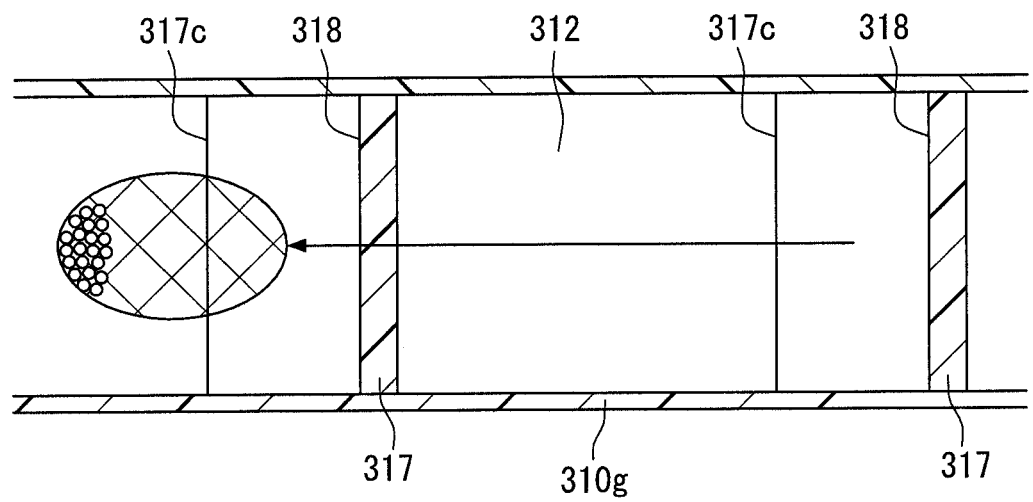
FIG. 7 is another cross-sectional schematic view for describing the effects and advantages according to the first embodiment.
Figure 10:
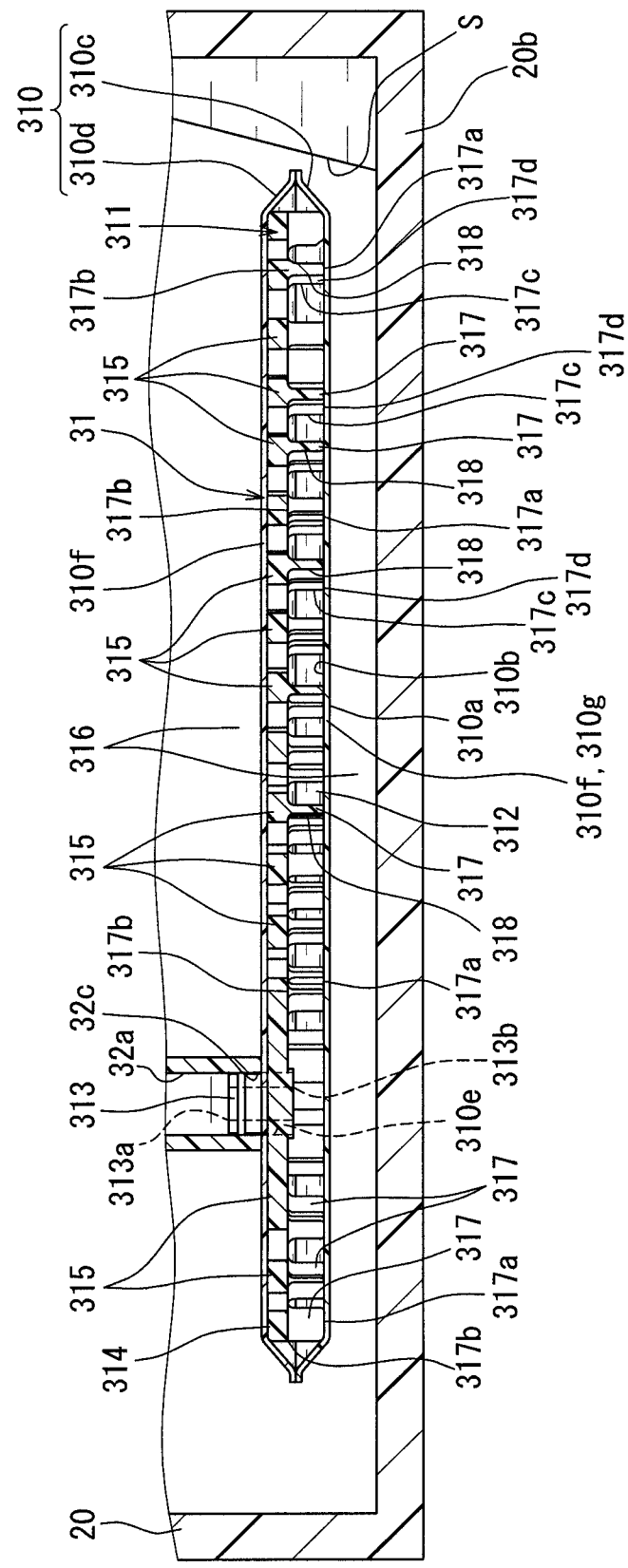
FIG. 10 is a cross-sectional view showing a different state of an inside of a sub-tank, which is different from a state of the inside of the sub-tank shown in FIG. 1.

According to the first embodiment, at the filter screen 310 that covers the inside space 312, in which the negative suction pressure is exerted through the suction port 32a of the fuel pump 32, the bottom wall 310g, which forms the inside space 312, filters the fuel that permeates through the bottom wall 310g. Therefore, at the inside space 312, which is formed by the bottom wall 310g, the fuel, which flows from the suction port 32a along the bottom wall 310g toward the away side that is away from the suction port 32a, is stopped by the fuel stoppers 317, which project toward the bottom wall 310g side, as shown in FIG. 6. Therefore, in the present embodiment, when the fuel in the sub-tank 20 in the fuel tank 2 is forced and is displaced to the one side in the sub-tank 20 by the action of the inertial force F as shown in FIG. 10 to result in the exposure of the filter screen 310 from the fuel surface S, the air is mixed as the air bubbles in the fuel that is stopped by the fuel stoppers 317, as shown in FIG. 6. Specifically, when the amount of the fuel in the inside space 312 is reduced due to the exposure of the filter screen 310 out of the fuel surface S, the air, the amount of which corresponds to the reduced amount of the fuel in the inside space 312, is drawn from the outside of the fuel surface S into the inside space 312 through the bottom wall 310g. In this way, the air, which is drawn into the inside space 312, is mixed in the form of air bubbles in the fuel that is stopped by the fuel stoppers 317. Thus, the fuel in the air mixed state receives the negative suction pressure through the suction port 32a, and thereby in an area, in which the inertial force F is applied to the fuel toward the away side, the fuel in the air mixed state can be moved toward the suction port 32a against the inertial force F, as shown in FIG. 7.

Figure 8:
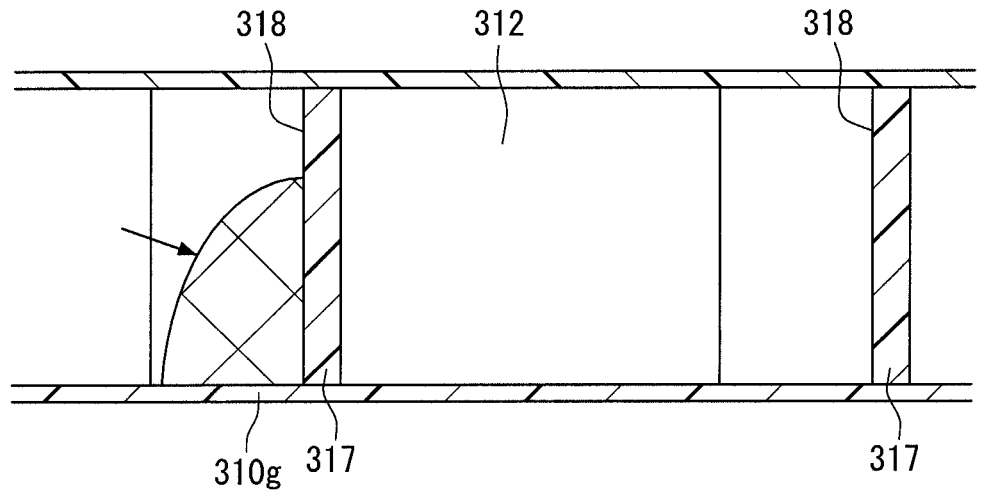
FIG. 8 is a further cross-sectional schematic view for describing the effects and advantages according to the first embodiment.
Figure 9:
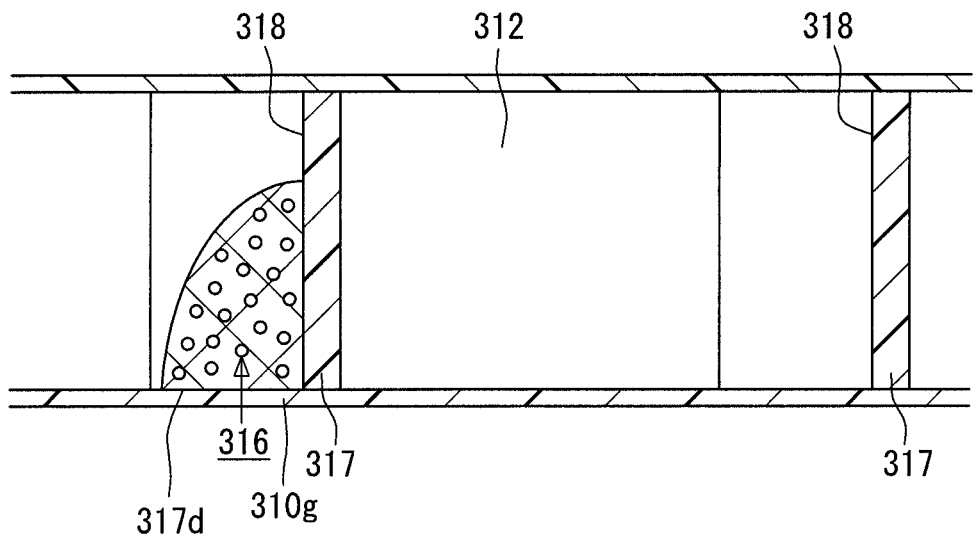
FIG. 9 is an additional cross-sectional schematic view for describing the effects and advantages according to the first embodiment.

At this time, as the movement of the fuel further progresses, the fuel begins to move toward the away side as shown in FIG. 8 due to the difference in the inertial force F acting on the fuel. However, due to the structure, in which the fuel stoppers 317 are spread toward the away side, even when the fuel returns toward the away side after movement of the fuel from the previous stop location, at which the fuel is stopped by one of the fuel stoppers 317, toward the suction port 32a, the fuel can be stopped once again by another one of the fuel stoppers 317, which is located on the suction port 32a side of the previous stop location, as shown in FIG. 9. Accordingly, as shown in FIG. 9, the air is mixed in the fuel at this subsequent stop location, so that the movement of the fuel is repeated. Thereby, even in the air-suctioning state where the air is suctioned into the inside space 312, the fuel in the inside space 312 can be drawn into the suction port 32a by using the air to promote the movement of the fuel. Therefore, according to the first embodiment, a required fuel suction efficiency of the fuel pump 32 for suctioning the fuel into the suction port 32a can be ensured. In addition, according to the first embodiment, in which the fuel discharged from the fuel pump 32 is supplied to the internal combustion engine 3 of the vehicle, it is possible to limit the drivability deterioration and the engine stall.

Here, in the area, in which the fuel receives the inertial force F that is exerted toward the suction port 32a, even when the fuel is in the air mixed state, the fuel can be preferentially drawn into the suction port 32a by the inertial force F. Therefore, the required suction efficiency for suctioning the fuel into the suction port 32a is ensured, and at the same time the advantage of limiting the drivability deterioration and the engine stall will be less likely interfered even in the area, in which the fuel receives the inertial force F that is exerted toward the suction port 32a.

Furthermore, as shown in FIGS. 6 and 8, the fuel stoppers 317, each of which has the fuel holding portion 318 that opens toward the bottom wall 310g and holds the fuel from the away side, stop the fuel directed toward the away side and implement the holding function for holding the fuel. Thereby, the air, which penetrates through the bottom wall 310g, passes through the bottom-wall-side opening 317d of the fuel holding portion 318, so that this air can be easily mixed with the fuel that is held at the fuel holding portion 318. Accordingly, when the fuel is moved toward the away side after the movement of the fuel toward the suction port 32a from the previous stop location, at which the fuel is stopped by the corresponding one of the fuel stoppers 317, the fuel is stopped and held once again by the other one of the fuel stoppers 317 located on the suction port 32a side of the previous stop location. Thereby, the mixing of the fuel with the air can be promoted. As a result, an efficiency of the reciprocating movement of the fuel, which is promoted by the air, can be improved, and thereby the suction efficiency for suctioning the fuel into the suction port 32a can be improved.

Furthermore, the air, which permeates through the bottom wall 310g, can reliably pass through the bottom-wall-side opening 317d of the fuel holding portion 318, which is covered with the bottom wall 310g, as indicated by an arrow in FIGS. 6 and 9. In this way, the fuel, which is held in the fuel holding portion 318, can be reliably mixed with the air that passes through the bottom-wall-side opening 317d. Therefore, the first embodiment, which uses the bottom-wall-side opening 317, is effective in terms of: improving the efficiency of the reciprocating movement of the fuel, which is promoted by the air; and thereby improving the suction efficiency for suctioning the fuel into the suction port 32a.

Furthermore, at the fuel holding portion 318, which opens not only toward the bottom wall 310g but also toward the suction port 32a, the fuel is mixed with the air that has passed through the bottom-wall-side opening 317d, so that the movement of the air toward the suction port 32a through the suction-port-side opening 317c can be implemented, as shown in FIG. 7. Accordingly, the reciprocating movement of the fuel, which is promoted by the air, can be facilitated, and thereby the suction efficiency for suctioning the fuel into the suction port 32a can be improved.

In addition, there is provided the structure, in which the fuel stoppers 317 are placed at: the support frame 314 placed at the away-side periphery portion of the inside space 312; and the beams 315 respectively placed at the plurality of portions of the inside space 312, which are located on the suction port 32a side of the away-side periphery portion in the inside space 312. According to this structure, the reciprocating movement of the fuel can be made at any location throughout the inside space 312. Accordingly, an effective time period, during which the required suction efficiency for suctioning the fuel into the suction port 32a is ensured, can be lengthened to increase the effective amount of suctioned fuel that is suctioned into the inside space 312 and is effectively used.

Furthermore, there is provided the structure, in which the corresponding ones of the fuel stoppers 317 are arranged one after another in the circumferential direction at each of the concentric circles Cc, which are concentric about the suction port 32a. According to this structure, even when an exerting direction of the inertial force F is changed, the other corresponding fuel stoppers 317 can still exist on the corresponding away side that corresponds to the exerting direction of the inertial force F after the change of the exerting direction of the inertial force F. In this way, the reciprocating movement of the fuel, which is promoted by the air, can be progressively generated regardless of the exerting direction of the inertial force F, and thereby the required suction efficiency for suctioning the fuel into the suction port 32a can be ensured.

Furthermore, there is provided the structure, in which the corresponding ones of the fuel stoppers 317, which are arranged along one of corresponding adjacent two of the concentric circles Cc, are displaced in the circumferential direction from the other corresponding ones of the fuel stoppers 317, which are arranged along the other one of the corresponding adjacent two of the concentric circles Cc. According to this structure, the movement of the fuel from the stop location, at which the fuel is stopped by the corresponding fuel stopper 317, toward the suction port 32a is less likely interfered by the other fuel stopper 317 located on the suction port 32a side of the above stop location. Therefore, the fuel, which is in the air mixed state at the stop location for stopping the fuel by the corresponding fuel stopper 317, moves toward the suction port 32a side beyond the other fuel stopper 317 located on the suction port 32a side of the above stop location and then moves toward the away side, and thereby this fuel can be stopped by the other fuel stopper 317 once again. Accordingly, the reciprocating movement of the fuel, which is promoted by the air, can be reliably generated regardless of the exerting direction of the inertial force F, and thereby the suction efficiency for suctioning the fuel into the suction port 32a can be improved.

Furthermore, the support element 311, which has the fuel stoppers 317, is received in the inside space 312 and supports the filter screen 310, so that the shape of the filter screen 310 can be maintained by the support element 311. Accordingly, in response to the decrease in the amount of fuel in the inside space 312 at the time of exposing the filter screen 310, the air, which corresponds to the amount of decrease in the fuel in the inside space 312, can be reliably drawn into the inside space 312 of the filter screen 310, the shape of which is maintained by the support element 311. Therefore, the mixing of the air in the air bubble state into the fuel stopped by the fuel stopper 317 can be easily ensured. Thereby, the first embodiment, which uses the support element 311, is effective in terms of: improving the efficiency of the reciprocating movement of the fuel, which is promoted by the air; and thereby improving the suction efficiency for suctioning the fuel into the suction port 32a.

Second Embodiment

Figure 11:
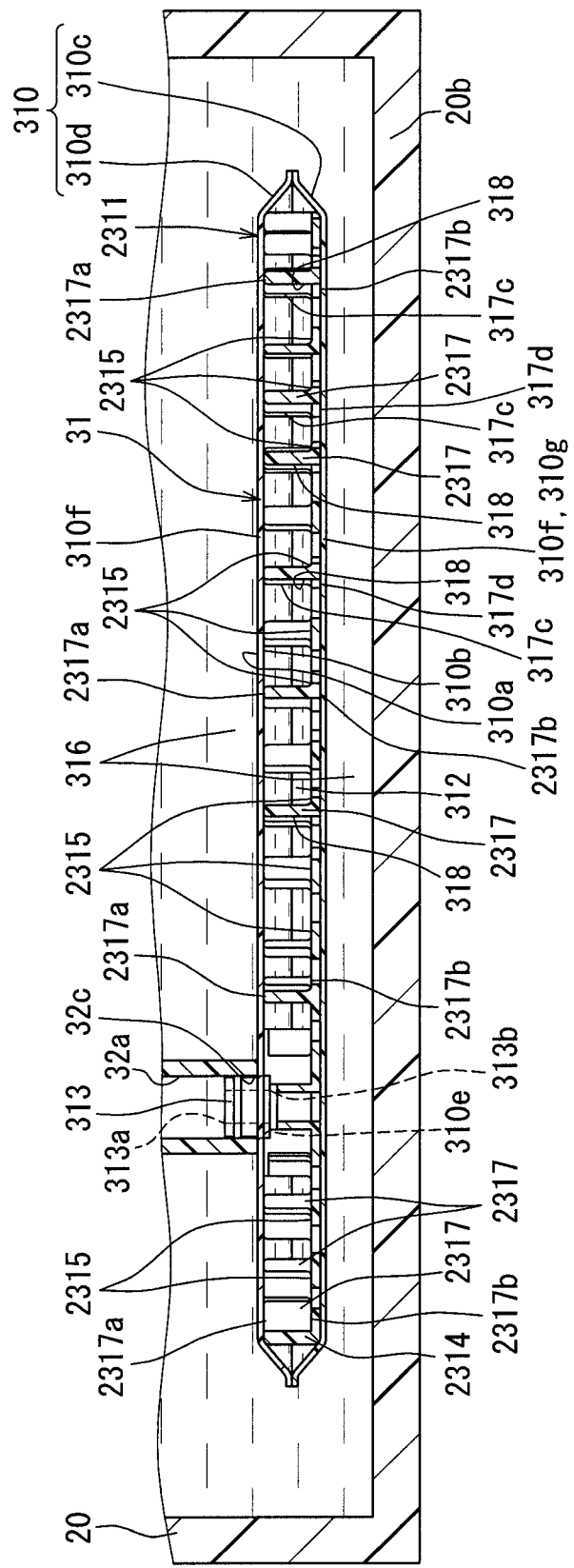
FIG. 11 is an enlarged cross-sectional view showing a suction filter according to a second embodiment.

A second embodiment of the present disclosure is a modification of the first embodiment. As shown in FIG. 11, a support frame 2314 of a support element 2311 of the second embodiment supports the lower filter sheet 310c of the filter screen 310 from the upper side of the lower filter sheet 310c. Furthermore, as shown in FIGS. 11 to 13, at the support element 2311 of the second embodiment, each of the fuel stoppers 2317 projects toward the upper side of at least one of the beams 2315 and the support frame 2314 to support the upper filter sheet 310d of the filter screen 310 from the lower side of the upper filter sheet 310d through an upper end part 2317a of the fuel stopper 2317.

Figure 12:
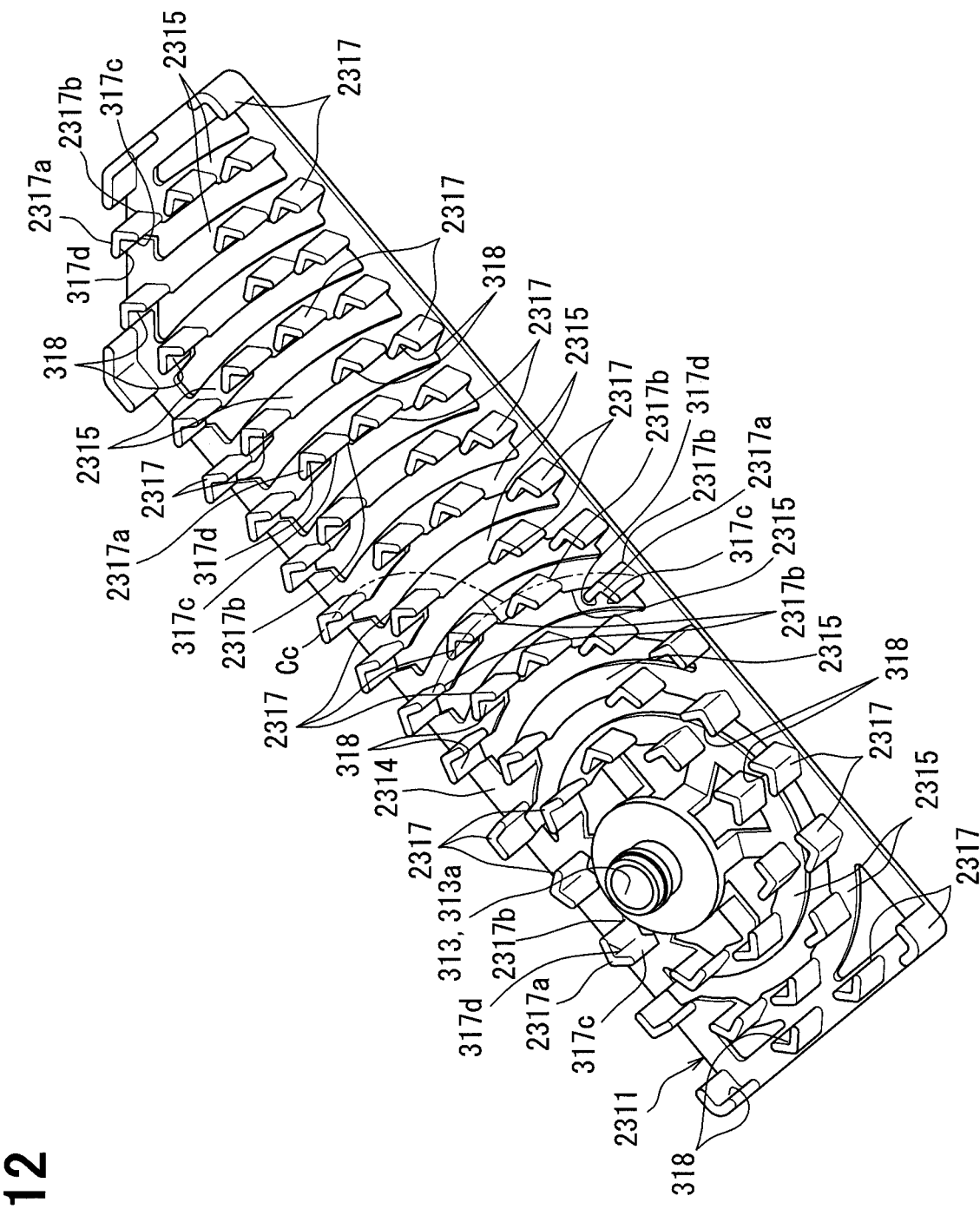
FIG. 12 is an upper surface side perspective view showing a support element according to the second embodiment.
Figure 13:
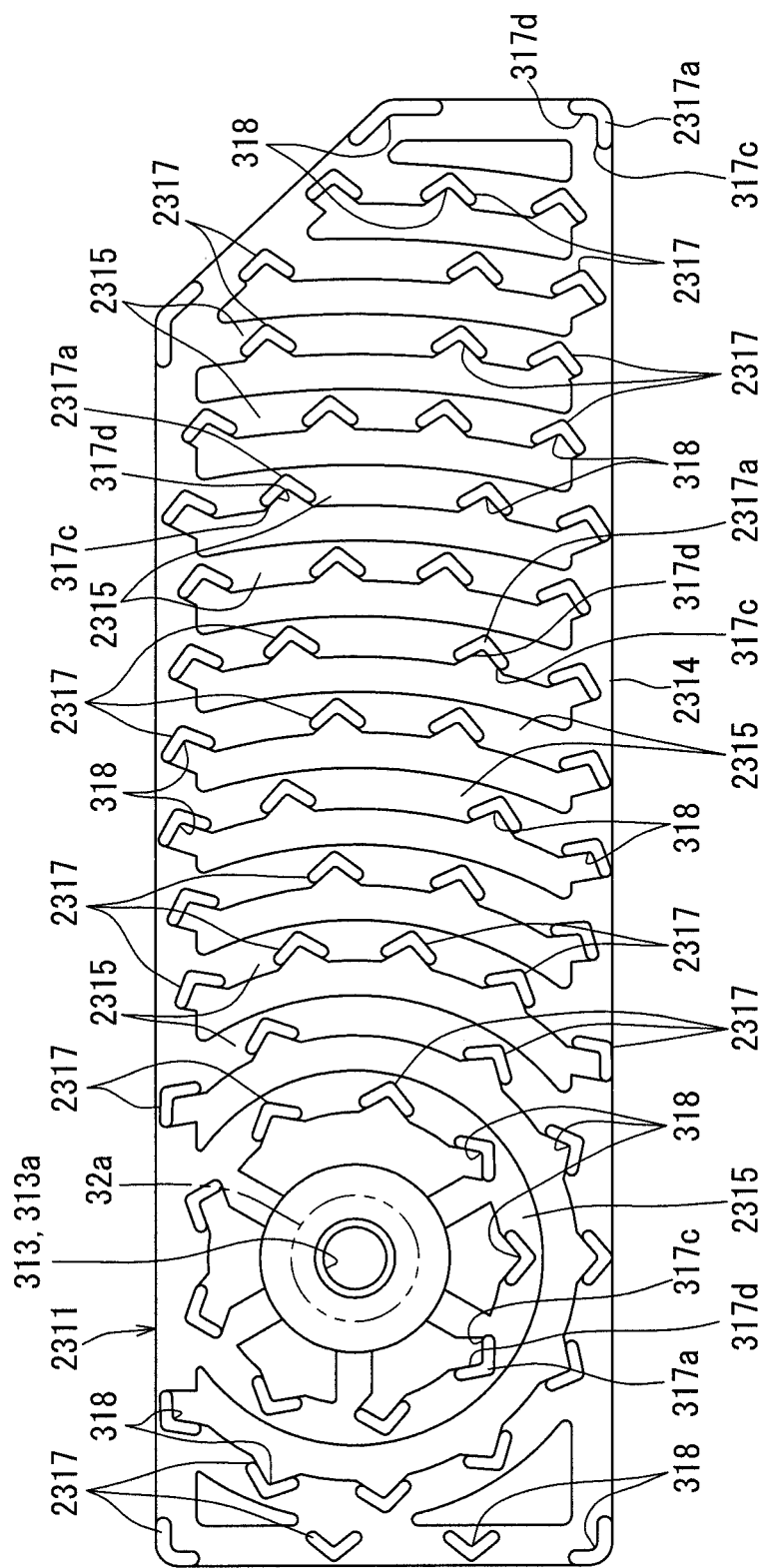
FIG. 13 is a bottom surface view showing the support element according to the second embodiment.

As shown in FIG. 12, lower end parts 2317b of the corresponding fuel stoppers 2317 are interconnected with each other in the circumferential direction of the corresponding concentric circle Cc by the corresponding beam 2315 or are interconnected with each other in the circumferential direction of the support frame 2314 by the support frame 2314. With the above connecting configuration, particularly, the beams 2315 can implement a function of auxiliary stoppers that stop the fuel moving toward the away side in the inside space 312. The support element 2311, which is described above, has the structure that is similar to that of the first embodiment except the portions described above.

According to the second embodiment, the beams 2315, each of which serves as the auxiliary stopper that interconnects the lower end parts 2317b of the corresponding fuel stoppers 2317 in the circumferential direction of the corresponding concentric circle Cc, stop the fuel that moves toward the away side in the inside space 312. In this way, the air, which permeates through the bottom wall 310g, can be mixed in the form of air bubbles in the fuel, which is stopped by the beams 2315. Therefore, the fuel, which is moved toward the away side after moving from the stop location for stopping the fuel by the corresponding fuel stopper 2317 and the corresponding beam 2315 toward the suction port 32a side, can be stopped by the other fuel stopper 2317 and the other beam 2315 located on the suction port 32a side once again and can be mixed with the air. In this way, the number of the mixing locations, at each of which the fuel and the air are mixed together, is increased, and thereby it is possible to improve the efficiency of the reciprocating movement of the fuel, which is promoted by the air, and thereby it is possible to improve the suction efficiency for suctioning the fuel into the suction port 32a.

Other Embodiments

The embodiments of the present disclosure have been described. However, the present disclosure should not be limited to these embodiments and may be applied to other various embodiments and a combination(s) of the embodiments without departing from the scope of the present disclosure.

As a first modification, the fuel stoppers 317, 2317 can be formed into any other form that is other than the form of the bent plate that has the V-shape in the plan view taken from the lower side thereof as long as the fuel, which moves from the suction port 32*a* toward the away side, can be stopped.

Figure 14:
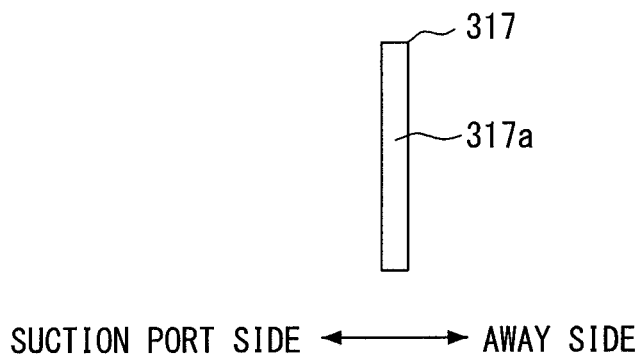
FIG. 14 is a bottom surface schematic view showing a modification of the first embodiment.
Figure 15:
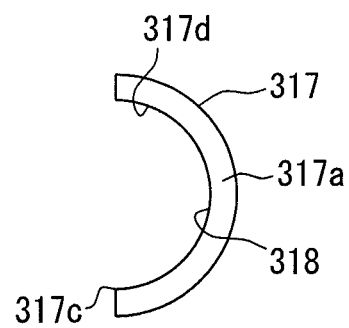
FIG. 15 is a bottom surface schematic view showing another modification of the first embodiment.
Figure 16:
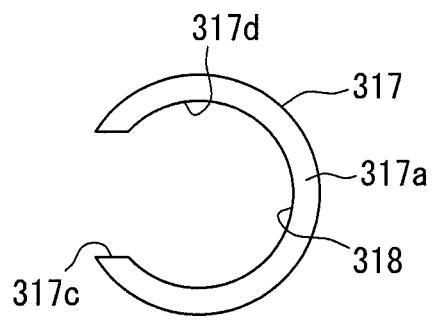
FIG. 16 is a bottom surface schematic view showing another modification of the first embodiment.
Figure 17:
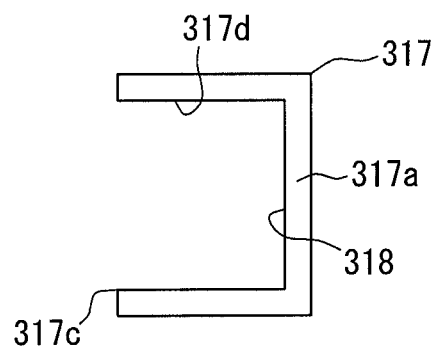
FIG. 17 is a bottom surface schematic view showing another modification of the first embodiment.
Figure 18:
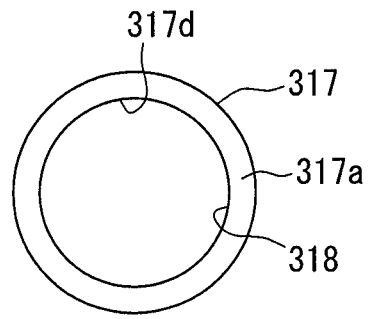
FIG. 18 is a bottom surface schematic view showing another modification of the first embodiment.

With respect to the first modification, specifically, the fuel stoppers 317, 2317 may be formed in a form of a planar plate that has an I-shape in the plan view taken from the lower side thereof, as shown in FIG. 14. Alternatively, the fuel stoppers 317, 2317 may be formed in a form of a curved plate that has a semicircular ring shape or a C-shape in the plan view taken from the lower side thereof, as shown in FIGS. 15 and 16. Further alternatively, the fuel stoppers 317, 2317 may be formed in a form of a bent plate that is bent at, for example, two locations and thereby has a U-shape in the plan view taken from the lower side thereof, as shown in FIG. 17. Further alternatively, the fuel stoppers 317, 2317 may be formed in a form of a cylindrical tube that has a circular ring shape in the plan view taken from the lower side thereof, as shown in FIG. 18. Further alternatively, the fuel stoppers 317, 2317 may be formed to have a combination of the shape of the first or second embodiment and at least one of the shapes indicated in FIGS. 14 to 18.

Particularly, the shapes indicated in FIGS. 15 to 17 as the first modification have the bottom-wall-side opening 317*d* and the suction-port-side opening 317*c* to enable the holding of the fuel from the away side. Furthermore, particularly, the shape indicated in FIG. 18 has the bottom-wall-side opening 317*d* to enable the holding of the fuel from the away side and enable the movement of the fuel, which is once held by the fuel stopper 317, toward the suction port 32*a* in the inside space 312 after passing thorough the bottom wall 310*g*. FIGS. 15 to 18 respectively indicate the first modification of the first embodiment.

Figure 19:
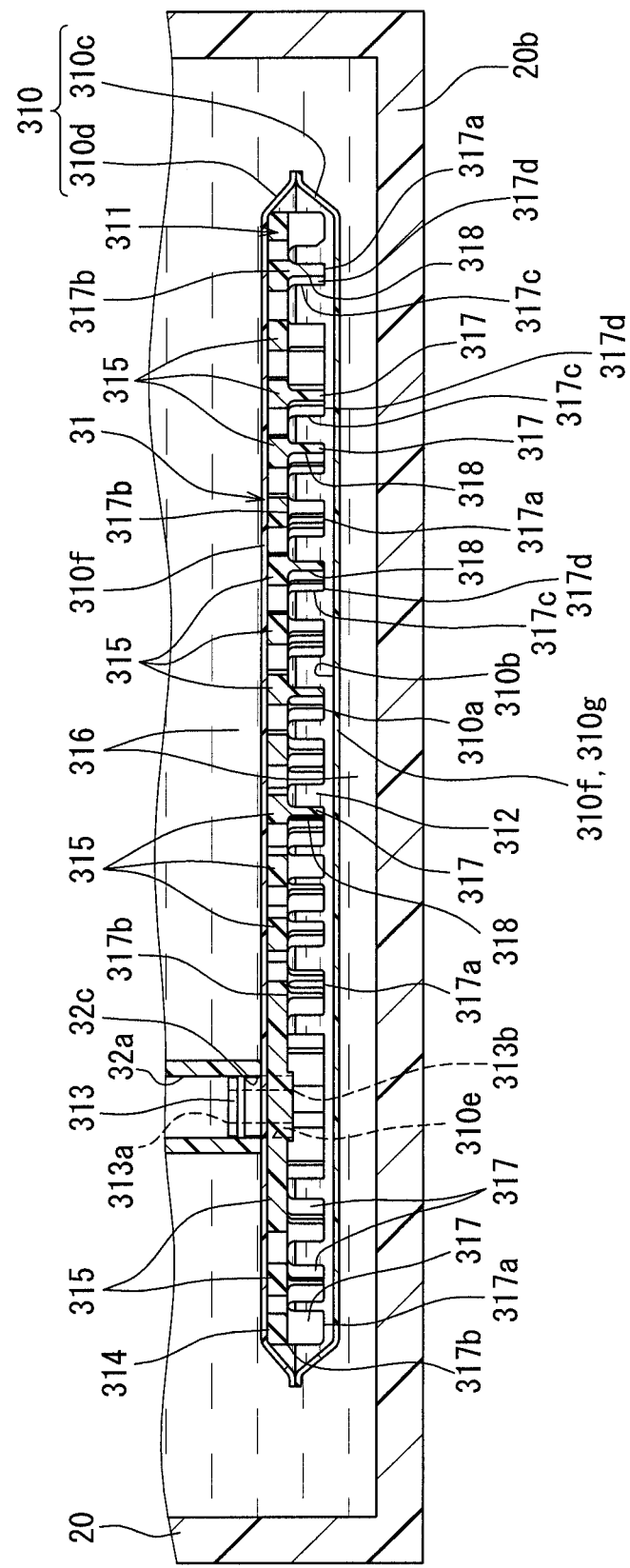
FIG. 19 is a cross-sectional view showing another modification of the first embodiment.

As a second modification, the bottom-wall-side opening 317*d* of each fuel stopper 317, 2317 may be spaced from the bottom wall 310*g* and thereby may be not covered with the bottom wall 310*g*, as indicated in FIG. 19. FIG. 19 indicates the second modification of the first embodiment.

Figure 20:
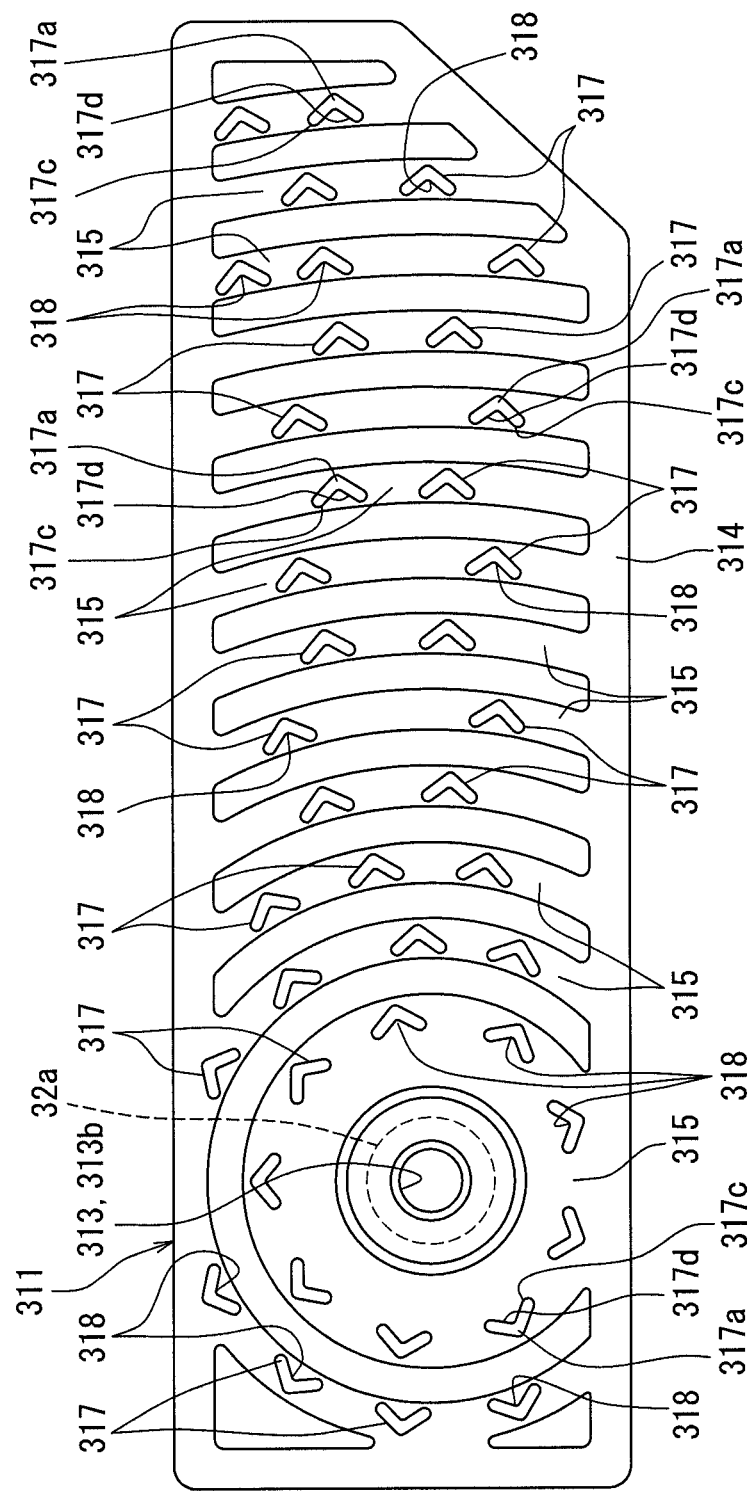
FIG. 20 is a bottom surface view showing a further modification of the first embodiment.

As a third modification, the fuel stoppers 317, 2317 may not project from the support frame 314, 2314, as shown in FIG. 20. In this third modification, the fuel stoppers 317, 2317 are not placed at the away-side periphery portion in the inside space 312 and are placed only at the plurality of portions, which are located on the suction port 32*a* side of the away-side periphery portion in the inside space 312. FIG. 20 indicates the third modification of the first embodiment.

As a fourth modification, the fuel stoppers 317, 2317 may be arranged such that a single fuel stopper 317, 2317 is placed at each of the concentric circles Cc. As a fifth modification, each of the fuel stoppers 317, 2317, which are arranged along one of corresponding adjacent two of the concentric circles Cc, may be completely overlapped in the radial direction of the concentric circles Cc with the corresponding adjacent one of the fuel stoppers 317, 2317, which are arranged along the other one of the corresponding adjacent two of the concentric circles Cc, without circumferentially displacing these stoppers 317, 2317 from each other.

Figure 21:
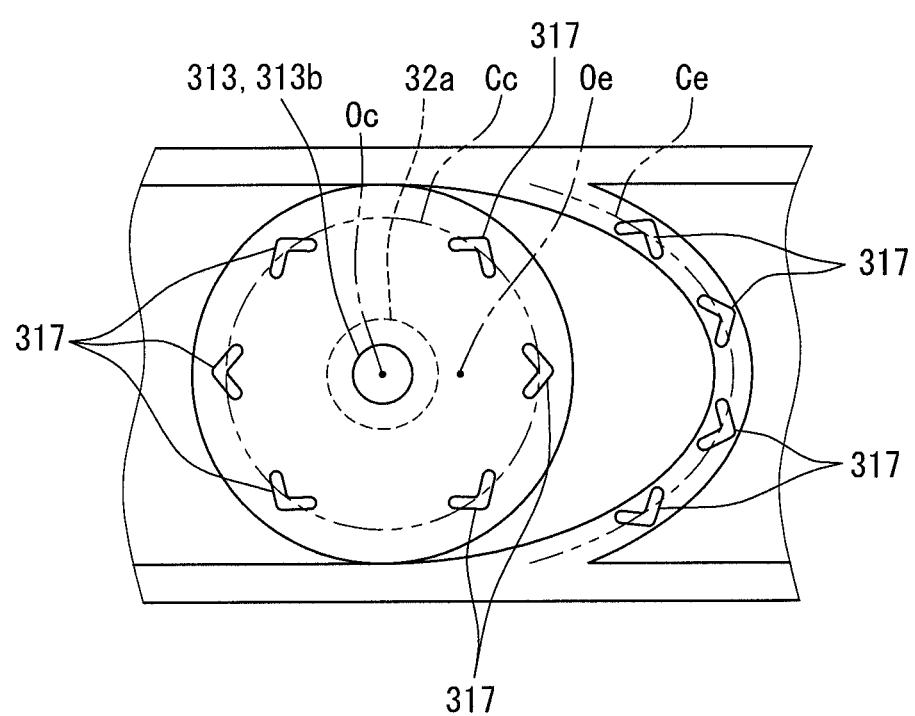
FIG. 21 is a bottom surface view showing a further modification of the first embodiment.

As a sixth modification, as shown in FIG. 21, a predetermined number (a plurality in, for example, in FIG. 21) of fuel stopper(s) 317, 2317 may be placed along one of a perfect circle Cc and an ellipse Ce, which are eccentric to each other. FIG. 21 indicates the sixth modification of the first embodiment. In FIG. 21, a reference sign Oc indicates the center point of the perfect circle Cc that is the center point common to the suction port 32*a* and the communication opening 313. In FIG. 21, a reference sign Oe indicates the center point of the ellipse Ce.

As a seventh modification, the support element 311 of the first embodiment may additionally include the beams 2315 of the second embodiment. As an eighth modification, the sub-tank 20 may be eliminated from the fuel supply device 1. As a ninth modification, the opening 32*c* of the suction port 32*a* may open toward another direction, such as a transverse direction, which is other than the downward direction.

As a tenth modification, the suction filter 31 may be provided with a hard external skeletal element that supports the filter screen 310 from the outside of the filter screen 310. Furthermore, in the case of the tenth modification, the external skeletal element may be placed such that the external skeletal element contacts the bottom portion 20*b* of the sub-tank 20 and is thereby supported by the sub-tank 20 and the fuel tank 10.

As an eleventh modification, the filter screen 310 may be partially formed by a non-permeable material, through which the fuel and the air are not permeable, as long as at least a portion of the inside space 312 is covered at least by the bottom wall 310*g* from the lower side of the inside space 312. For example, the filter sheet 310*d* may be made of the non-permeable material, through which the fuel and the air are not permeable. Alternatively, a portion of the filter sheet 310*c* and a portion of the filter sheet 310*d* may be made of the non-permeable material, through which the fuel and the air are not permeable.

The invention claimed is:

1. A suction filter, through which fuel is suctioned into a suction port of a fuel pump after filtering the fuel in an inside of a fuel tank of a vehicle, the suction filter comprising:
    a filter screen that is placed to cover an inside space, in which a negative suction pressure is exerted from the suction port, wherein the filter screen includes a bottom wall that forms the inside space and is formed as a permeable wall, through which the fuel and air are permeable, and the filter screen filters the fuel permeated through the permeable wall; and
    a plurality of fuel stoppers that are arranged along the bottom wall from a side, at which the suction port is located, toward an away side, which is away from the suction port, wherein:
    the plurality of fuel stoppers extends toward the bottom wall in the inside space;
    each of the plurality of fuel stoppers includes a fuel holding portion, which opens toward the bottom wall and is configured to hold the fuel from the away side; and
    the plurality of fuel stoppers includes a first plurality of fuel stoppers fully circumferentially arranged along a perfect circle around the suction port and a second plurality of fuel stoppers arranged along at least one circular or ellipsoidal arc located radially outside the first plurality.

2. The suction filter according to claim 1, wherein an opening of each of the fuel holding portions, which is located on a side where the bottom wall is placed, is covered with the bottom wall.

3. The suction filter according to claim 1, wherein each of the fuel holding portions opens toward the suction port.

4. The suction filter according to claim 1, wherein the plurality of fuel stoppers is placed at:
   a periphery portion, which is located at the away side in the inside space; and
   a plurality of portions, which are located on a side of the periphery portion where the suction port is placed in the inside space.

5. The suction filter according to claim 1, wherein corresponding ones of the plurality of fuel stoppers are arranged one after another in a circumferential direction at each of a plurality of concentric circles that are concentric about the suction port.

6. The suction filter according to claim 5, wherein the corresponding ones of the plurality of fuel stoppers, which are arranged along one of corresponding adjacent two of the plurality of concentric circles, are displaced in the circumferential direction from the corresponding ones of the plurality of fuel stoppers, which are arranged along the other one of the corresponding adjacent two of the plurality of concentric circles.

7. The suction filter according to claim 5, further comprising a plurality of auxiliary stoppers, each of which interconnects lower end portions of the corresponding ones of the plurality of fuel stoppers in the circumferential direction and is configured to stop the fuel that flows toward the away side in the inside space.

8. The suction filter according to claim 1, further comprising a support element that is received in the inside space and supports the filter screen, wherein the plurality of fuel stoppers is formed at the support element.

9. A fuel supply device configured to supply fuel from an inside of a fuel tank of a vehicle toward an internal combustion engine located at an outside of the fuel tank, the fuel supply device comprising:
   a fuel pump that discharges the fuel, which is suctioned into a suction port of the fuel pump in the inside of the fuel tank, toward the outside of the fuel tank; and
   a suction filter, through which the fuel is suctioned into the suction port after filtering the fuel in the inside of the fuel tank, wherein the suction filter includes:
      a filter screen that is placed to cover an inside space, in which a negative suction pressure is exerted from the suction port, wherein the filter screen includes a bottom wall that forms the inside space and is formed as a permeable wall, through which the fuel and air are permeable, and the filter screen filters the fuel permeated through the permeable wall;
      a plurality of fuel stoppers that are arranged along the bottom wall from a side, at which the suction port is located, toward an away side, which is away from the suction port, wherein the plurality of fuel stoppers extends toward the bottom wall in the inside space, and each of the plurality of fuel stoppers includes a fuel holding portion, which opens toward the bottom wall and is configured to hold the fuel from the away side; and
   the plurality of fuel stoppers includes a first plurality of fuel stoppers fully circumferentially arranged along a perfect circle around the suction port and a second plurality of fuel stoppers arranged along at least one circular or ellipsoidal arc located radially outside the first plurality.

10. The suction filter according to claim 1, wherein the first plurality of fuel stoppers are arranged closer to the suction port than all of the remaining fuel stoppers including the second plurality of fuel stoppers.

11. A suction filter, through which fuel is suctioned into a suction port of a fuel pump after filtering the fuel in an inside of a fuel tank of a vehicle, the suction filter comprising:
   a filter screen that is placed to cover an inside space, in which a negative suction pressure is exerted from the suction port, wherein the filter screen includes a bottom wall that forms the inside space and is formed as a permeable wall, through which the fuel and air are permeable, and the filter screen filters the fuel permeated through the permeable wall; and
   a plurality of fuel stoppers that are arranged along the bottom wall from a side, at which the suction port is located, toward an away side, which is away from the suction port, wherein:
   the plurality of fuel stoppers extends toward the bottom wall in the inside space;
   each of the plurality of fuel stoppers includes a fuel holding portion, which opens toward the bottom wall and is configured to hold the fuel from the away side;
   the plurality of fuel stoppers is placed at:
      a periphery portion, which is located at the away side in the inside space; and
      a plurality of portions, which are located on a side of the periphery portion where the suction port is placed in the inside space.

12. A suction filter, through which fuel is suctioned into a suction port of a fuel pump after filtering the fuel in an inside of a fuel tank of a vehicle, the suction filter comprising:
   a filter screen that is placed to cover an inside space, in which a negative suction pressure is exerted from the suction port, wherein the filter screen includes a bottom wall that forms the inside space and is formed as a permeable wall, through which the fuel and air are permeable, and the filter screen filters the fuel permeated through the permeable wall; and
   a plurality of fuel stoppers that are arranged along the bottom wall from a side, at which the suction port is located, toward an away side, which is away from the suction port, wherein:
   the plurality of fuel stoppers extends toward the bottom wall in the inside space;
   each of the plurality of fuel stoppers includes a fuel holding portion, which opens toward the bottom wall and is configured to hold the fuel from the away side;
   corresponding ones of the plurality of fuel stoppers are arranged one after another in a circumferential direction at each of a plurality of concentric circles that are concentric about the suction port; and
   the corresponding ones of the plurality of fuel stoppers, which are arranged along one of corresponding adjacent two of the plurality of concentric circles, are displaced in the circumferential direction from the corresponding ones of the plurality of fuel stoppers, which are arranged along the other one of the corresponding adjacent two of the plurality of concentric circles.

13. A suction filter, through which fuel is suctioned into a suction port of a fuel pump after filtering the fuel in an inside of a fuel tank of a vehicle, the suction filter comprising:
   a filter screen that is placed to cover an inside space, in which a negative suction pressure is exerted from the suction port, wherein the filter screen includes a bottom wall that forms the inside space and is formed as a permeable wall, through which the fuel and air are permeable, and the filter screen filters the fuel permeated through the permeable wall; and a plurality of fuel stoppers that are arranged along the bottom wall from a side, at which the suction port is located, toward an away side, which is away from the suction port, wherein:

the plurality of fuel stoppers extends toward the bottom wall in the inside space;

each of the plurality of fuel stoppers includes a fuel holding portion, which opens toward the bottom wall and is configured to hold the fuel from the away side;

corresponding ones of the plurality of fuel stoppers are arranged one after another in a circumferential direction at each of a plurality of concentric circles that are concentric about the suction port; and the suction filter further comprises a plurality of auxiliary stoppers, each of which interconnects lower end portions of the corresponding ones of the plurality of fuel stoppers in the circumferential direction and is configured to stop the fuel that flows toward the away side in the inside space.

\* \* \* \* \*